H. C. HAYS.
GEAR SHIFTING MECHANISM.
APPLICATION FILED JUNE 5, 1916.
1,207,913.
Patented Dec. 12, 1916.
2 SHEETS—SHEET 2.
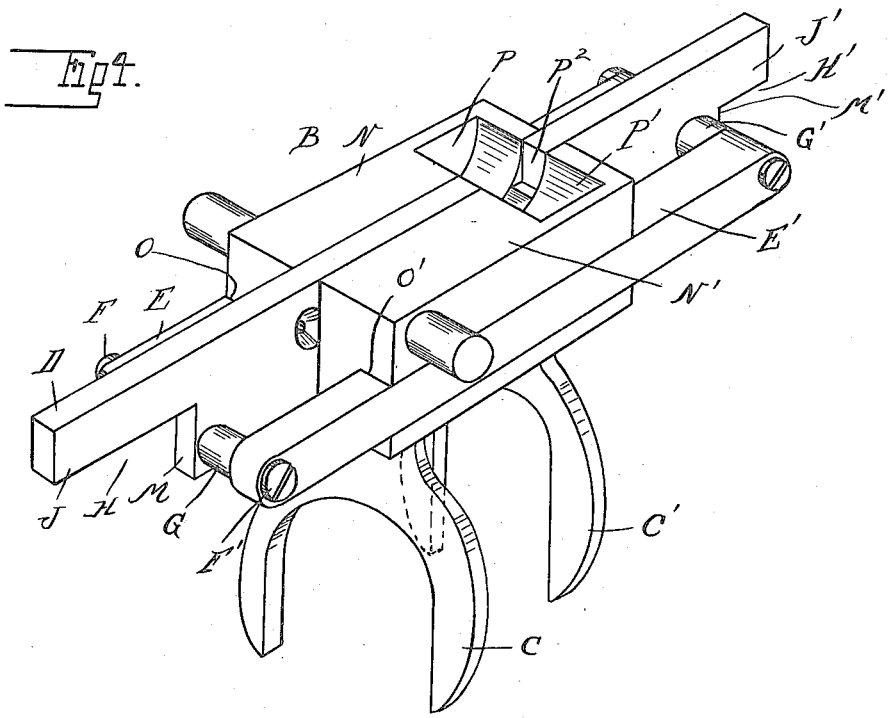
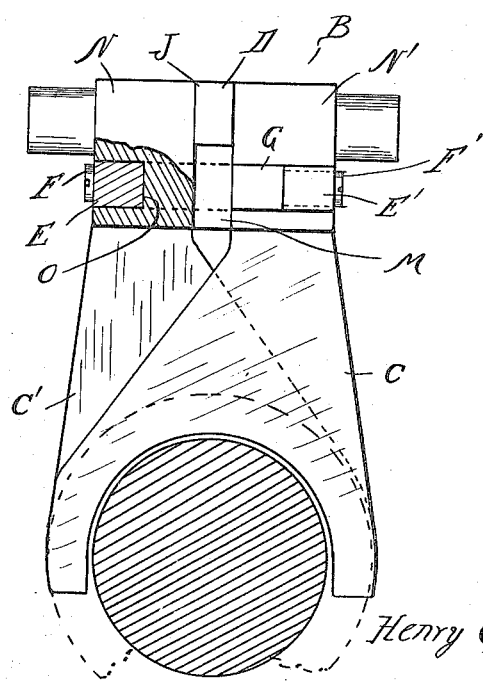
Inventor
Henry C. Hays
By Whittemore Hulbert + Whittemore
Attorneys

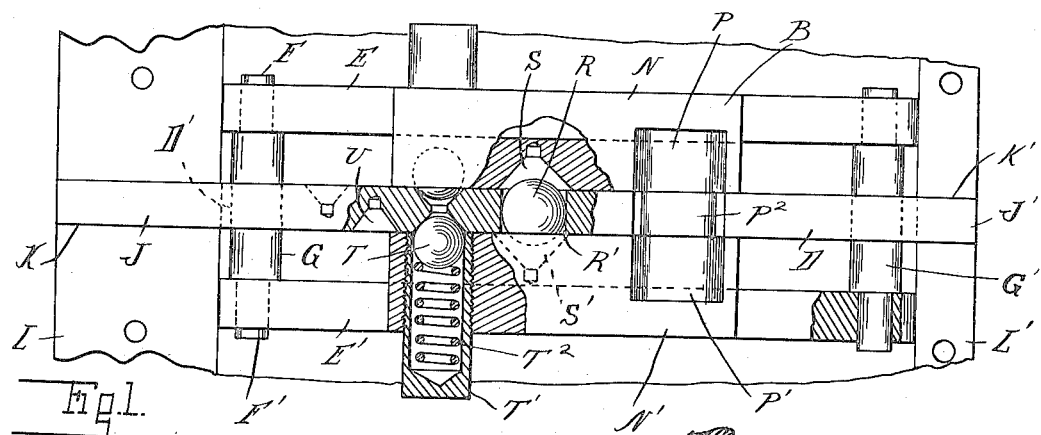
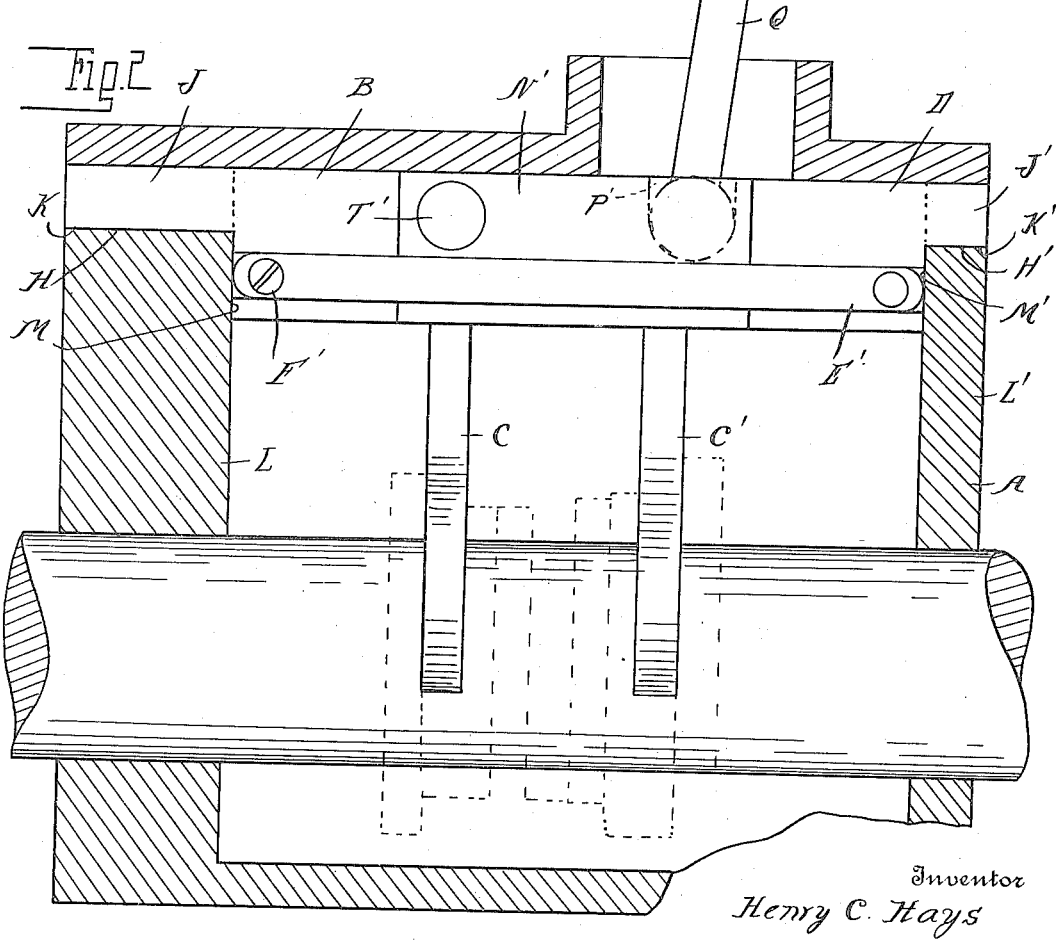

UNITED STATES PATENT OFFICE.

HENRY C. HAYS, OF DETROIT, MICHIGAN, ASSIGNOR TO ANTHONY J. DETLAFF, OF DETROIT, MICHIGAN.

GEAR-SHIFTING MECHANISM.

1,207,913.  Specification of Letters Patent.  Patented Dec. 12, 1916.

Application filed June 5, 1916. Serial No. 101,784.

*To all whom it may concern:*

Be it known that I, HENRY C. HAYS, a citizen of the United States of America, residing at Detroit, in the county of Wayne and State of Michigan, have invented certain new and useful Improvements in Gear-Shifting Mechanisms, of which the following is a specification, reference being had therein to the accompanying drawings.

This invention relates to gear shifting mechanism and refers more particularly to gear shifting mechanisms used in connection with variable speed engines.

One of the main objects of the invention is to provide a gear shifting mechanism which can be formed as a unit, this shifter unit being so arranged that it can be assembled outside of the gear case and engaged with or dis-engaged from the latter as a unit.

Other objects of the invention are to provide a shifter unit that can be economically manufactured and assembled and which will be capable of use with standard constructions of transmission gearing.

The invention further resides in such features of construction and arrangements and combinations of parts as will more fully hereinafter appear.

In the drawings: Figure 1 is a top plan view partly in section of the shifter unit; Fig. 2 is a side elevational view thereof; Fig. 3 is an end view of the shifter unit; Fig. 4 is a perspective view of the shifter unit detached.

Describing in detail the construction shown in the drawings, A designates the housing for the transmission gearing and B the gear shifting unit. The latter comprises a pair of shifter forks C and C' slidably engaging a guide frame composed of a center bar D and parallel side bars E and E'. These frame bars are secured in fixed relation to each other by screw bolts F and F' passing through the respective side bars and having a threaded engagement with the sleeves G and G' which extend through the apertures D' in the center bar D. This center bar is of greater length than the side bars of the guide frame, the end portions being offset at H and H' to provide projections J and J'. The latter, when the unit is in place in the transmission housing, rest in slots K and K' formed in the opposite end walls L and L' of the casing A. When the ends of the bar D engage the slots K and K', the shoulders M and M' and the ends of the bars E and E' abut against the inner faces of these end walls and serve to hold the gear shifter unit from lateral movement in the housing. The depth of the slots L and L' is preferably so proportioned to the depth of the projecting ends J and J' that when the cover plate of the transmission housing is in position it will lock the shifter unit from vertical movement without the use of any extraneous securing devices. Thus to engage or dis-engage the unit it is only necessary to move it vertically into or out of engagement with the slots L and L'.

In addition to its function as part of the supporting means, the center bar D of the guide frame forms a material part of the shifter mechanism as follows. The shifter forks C and C' have head members N and N' which on their outer surfaces are longitudinally grooved at O and O' to receive the parallel side bars E and E' while the inner surfaces of these heads abut against the opposite sides of the center bar D.

P, P' and $P^2$ designate recesses formed in the heads N and N' and the center bar D respectively, said recesses being in transverse alinement with each other when the gears are in neutral position, and being adapted to receive the end of the shifter lever Q, which may be moved laterally from one shifter head to the other.

There is also provided an inter-locking mechanism comprising a ball R positioned in an aperture R' in the center bar D and shiftable laterally into one or the other of the recesses S and S' formed in the heads N and N'. Thus when one of the heads is shifted longitudinally on its side bar or guide it will force the ball into the recess in the other head and lock the latter from movement. Additional latching mechanism is also provided for holding the shifter forks in different positions of adjustment. Each of these latching mechanisms comprises a ball T positioned in a housing T' and spring pressed by a coil spring $T^2$ into various recesses U in the center bar D. For convenience in manufacturing and assembling, the housings T' are preferably formed separately and screw threaded into the heads N and N'.

A gear shifting mechanism such as above described can be constructed as a unit separately from the transmission housing and can be readily inserted or removed from the latter as a unit by simply moving it vertically so that the projecting ends J and J' are engaged with or dis-engaged from the slots K and K'. Moreover, when in assembled position, the shifter unit is held in rigid relation to the transmission housing without the employment of any additional securing members. I do not desire, however, to limit the invention to the particular features of construction or arrangement of parts shown and described, except as specified in the appended claims.

What I claim as my invention is:

1. The combination with a transmission gearing housing having slotted end walls, of a gearing shifter mechanism having a bar engageable by transverse movement with the slots in said end walls and means engaging said bar for holding the same in position in said housing.

2. A gear shifter unit comprising shifter forks, and a guide frame for said forks comprising parallel side bars and a center bar projecting beyond the ends of said side bar.

3. A gear shifter unit comprising shifter forks, and a guide frame for said forks comprising parallel side bars and a center bar projecting beyond the ends of said side bar, the projecting ends of the center bar and the ends of the side bar forming part of the supporting means for said unit.

4. A gear shifter unit comprising shifter forks, slidable heads for said forks and a guide frame for said heads comprising parallel side bars and a center bar, said center bar having a plurality of latch engaging detents and said slidable heads having a spring pressed member for engaging said detents.

5. A shifter unit comprising shifter forks, slidable heads carrying said forks, parallel side bars forming guides for said heads, a center bar having latch engaging detents, a housing having a screw threaded engagement within said heads and a latch member inclosed within said housing spring pressed against said center bar for holding the shifter head in different positions of adjustment.

6. The combination with a transmission housing and its cover, of a gear shifter mechanism forming a complete unit independent of said housing and cover and engageable with and disengageable from said housing as a unit when said cover is removed.

7. The combination with a transmission housing, of a gear shifter mechanism forming a complete unit independent of said housing and engageable with and disengageable from said housing as a unit, means for holding said unit in position in said housing, and said unit and housing having contacting surfaces for accurately positioning the unit independent of its securing means.

In testimony whereof I affix my signature.

HENRY C. HAYS.

Witnesses:
C. M. Carmichael,
H. K. Carson.